US008446495B2

United States Patent
Mochizuki et al.

(10) Patent No.: US 8,446,495 B2
(45) Date of Patent: May 21, 2013

(54) IMAGE PICKUP APPARATUS AND IMAGE PICKUP SYSTEM

(75) Inventors: Chiori Mochizuki, Honjo (JP); Minoru Watanabe, Honjo (JP); Takamasa Ishii, Honjo (JP); Jun Kawanabe, Kodama-gun (JP); Kentaro Fujiyoshi, Kumagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 12/912,690

(22) Filed: Oct. 26, 2010

(65) Prior Publication Data

US 2011/0134289 A1    Jun. 9, 2011

(30) Foreign Application Priority Data

Dec. 4, 2009  (JP) ................................. 2009-276830

(51) Int. Cl.
 *H04N 5/217* (2011.01)
 *G01D 18/00* (2006.01)

(52) U.S. Cl.
 USPC .......................................... 348/241; 378/207

(58) Field of Classification Search
 USPC ............................ 348/241–247; 378/91, 207;
    250/370.08–370.09; 382/128, 132
 See application file for complete search history.

(56) References Cited

U.S. PATENT DOCUMENTS

| 6,115,451 | A |  | 9/2000 | Boudry |
| 6,920,198 | B2 |  | 7/2005 | Xue |
| 7,186,980 | B2 | * | 3/2007 | Nonaka ...................... 250/336.1 |
| 7,489,346 | B2 | * | 2/2009 | Mizukura et al. .......... 348/223.1 |
| 7,822,178 | B2 | * | 10/2010 | Enomoto ........................ 378/91 |
| 7,830,423 | B2 | * | 11/2010 | Suzuki ............................ 348/241 |
| 8,023,013 | B1 | * | 9/2011 | Linzer et al. .................. 348/247 |
| 8,247,779 | B2 | * | 8/2012 | Kameshima et al. .... 250/370.09 |

* cited by examiner

*Primary Examiner* — Kelly L Jerabek (74) *Attorney, Agent, or Firm* — Canon U.S.A., Inc. IP Division (57) ABSTRACT

In an image pickup apparatus including a plurality of pixels arranged a matrix of rows and columns, a correction unit performs a correction process based on an electric signal output via a first switch element of a particular pixel and a correction electric signal output via a second switch element of the particular pixel. A correction image signal based on the correction electric signal output via the second switch element is acquired in a period that partially overlaps in time a period in which an image signal based on the electric signal output via the first switch element is acquired. When the electric signal associated with the image signal is output for the particular pixel, the second switch element of the particular pixel is controlled to be in an on-state over a period during which the first switch element of the particular pixel is in an off-state.

10 Claims, 9 Drawing Sheets

IMAGE PICKUP APPARATUS AND IMAGE PICKUP SYSTEM

BACKGROUND OF THE INVENTION

1. Field of the Invention

The present invention relates to an image pickup apparatus and an image pickup system. More particularly, the present invention relates to a radiation image pickup apparatus and a radiation image pickup system applicable for use in taking a general still image or a moving image in fluoroscopy for use in medical diagnosis.

2. Description of the Related Art

In recent years, a radiation image pickup apparatus using a flat panel detector (hereinafter referred to as a FPD) produced using a semiconductor material has been used in practical applications such as a medical diagnosis based on an X-ray or radiation image, a nondestructive inspection, etc.

One of such image pickup apparatuses is a digital image pickup apparatus used to take a general still image or a fluoroscopic moving image for use in medical diagnosis. U.S. Pat. No. 6,115,451 and U.S. Pat. No. 6,920,198 disclose techniques of processing image data obtained by such an image pickup apparatus to produce an image with improved clearness. More specifically, for example, a correction process is performed on image data to reduce an offset or lag signal.

In U.S. Pat. No. 6,115,451, it is described that the quality of offset depends on current leakage of a detector, temperature, an amount of background radiation, and other such factors. In U.S. Pat. No. 6,920,198, it is described that the lag signal originates from an effect of an image signal generated in previous exposure to radiation, and such a lag signal can produce an artifact such as a ghost in an image. Hereinafter, the offset and the lag signal are generically referred to as "offset", and a correction process to reduce the "offset" is referred to as an "offset correction".

U.S. Pat. No. 6,115,451 discloses an offset correction technique in which a detector is first exposed to radiation and then the detector is read to acquire a value indicating an amount of radiation exposure. When a period greater than an exposure period has elapsed since the reading of the amount of radiation exposure, an offset value is read. The offset correction is then performed by subtracting the offset value from the value indicating the amount of radiation exposure.

U.S. Pat. No. 6,920,198 discloses an offset correction technique in which an offset prediction model is produced, and the offset prediction model is updated periodically at least once during a scanning period in which one fluoroscopic image of a subject is produced. To periodically update the offset prediction model, at least one dark image (offset image) is acquired. An offset correction of the fluoroscopic image is performed using the updated offset prediction model.

In U.S. Pat. No. 6,115,451 and U.S. Pat. No. 6,920,198, after image data based on values indicating amounts of exposure to radiation or a fluoroscopic image is obtained, correction image data (image data for use in correction) based on detected offset values or a dark image is obtained separately from the image data in a similar manner to the image data. The offset correction is performed using the obtained correction image data.

However, in U.S. Pat. No. 6,115,451, image data is acquired after exposure to radiation is performed, and correction image data is acquired when a period greater than an exposure period has further elapsed since then. Therefore, to obtain correction image data after exposure to radiation is started, it takes a time at least twice longer than a time needed to acquire image data after exposure to radiation is started. Thus, it takes an inconveniently long time to display offset-corrected image data after exposure to radiation is started.

SUMMARY OF THE INVENTION

In view of the above, the present invention provides an image pickup apparatus capable of acquiring correction image data in a short time and performing good offset correction.

According to an embodiment of the present invention, there is provided an image pickup apparatus including a detection unit including a plurality of pixels arranged in a matrix of rows and columns, each pixel including a conversion element configured to convert radiation or light into an electric charge, a first switch element configured to output an electric signal corresponding to the electric charge, and a second switch element that is electrically connected to the conversion element and that is configured to output a correction electric signal, a correction unit configured to perform a correction process based on the electric signal output via the first switch element of a particular pixel and the correction electric signal output via the second switch element of the particular pixel, and a control unit configured to control an operation of the detection unit such that a correction image signal based on the correction electric signal output via the second switch element is acquired in a period that partially overlaps in time a period in which an image signal based on the electric signal output via the first switch element is acquired and such that when the electric signal associated with the image signal is output for the particular pixel, the second switch element of the particular pixel is controlled to be in an on-state over a period during which the first switch element of the particular pixel is in an off-state.

According to an embodiment of the present invention, there is provided an image pickup system including the image pickup apparatus described above and a control apparatus configured to control the image pickup apparatus.

The image pickup apparatus and the image pickup system are capable of acquiring correction image data in a short time and performing a high-precision offset correction.

Further features of the present invention will become apparent to persons having ordinary skill in the art from the following description of exemplary embodiments with reference to the attached drawings.

DESCRIPTION OF THE EMBODIMENTS

The present invention is described in further detail below with reference to embodiments in conjunction with the accompanying drawings. In the present description, the term "radiation" is used to describe a wide variety of radiant rays including various beams of particles (note that a photon is one of such particles) emitted via radioactive decay, such as an alpha beam, a beta beam, and a gamma ray, and other beams with energy similar to or greater than the energy of above-described beams, such as an X-ray, a corpuscular beam, a cosmic ray, etc.

First Embodiment

Figure 1A:
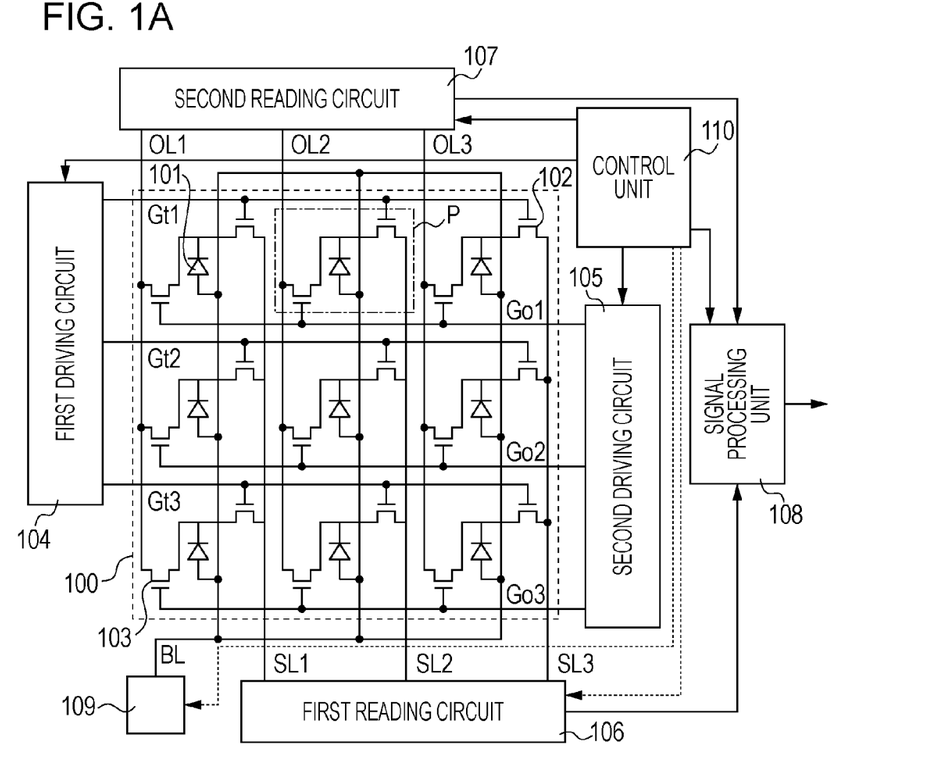
FIGS. 1A and 1B are equivalent circuit diagrams of an image pickup apparatus according to an embodiment of the present invention.

Referring to FIG. 1A, an image pickup apparatus according to a first embodiment of the present invention is described below.

In FIG. 1A, for the purpose of simplicity, a FPD of the image pickup apparatus includes only a small number of pixels arranged in 3 rows×3 columns. Note, however, that practical image pickup apparatuses may include a greater number of pixels. For example, a practical 17-inch image pickup apparatus includes a relatively large number of pixels arranged in 2800 rows×2800 columns.

A detection unit 100 includes a plurality of pixels P arranged in a matrix of n rows by m columns. Each pixel P includes a conversion element 101 configured to convert radiation or light into an electric charge and a first switch element 102 configured to output an electric signal corresponding to the electric charge. Each pixel P also includes a second switch element 103 that outputs an electric signal for use in offset correction described later.

In the present embodiment, the conversion elements may be PIN-type photodiodes formed mainly of amorphous silicon on an insulating substrate such as a glass substrate. Accordingly, the conversion elements are capable of converting incident light into electric charges. The type of the conversion element is not limited to the PIN-type photodiode, but other types of conversion elements may be employed. An example of a usable conversion element is an indirect conversion element having a wavelength conversion element disposed on a light-sensitive side of a photoelectric conversion element such that incident radiation is converted by the wavelength conversion element into light with a wavelength that can be sensed by the photoelectric conversion element. Another example is a direct conversion element capable of directly converting radiation into an electric charge.

As for the first switch element 102 and the second switch element 103, transistors having a control terminal and two main terminals may be used. In the present embodiment, thin film transistors (TFTs) are used.

One electrode of the conversion element 101 is electrically connected to one the two main terminals of the first switch element 102 and one of the two main terminals of the second switch element 103.

The first switch element and the second switch element may be similar to each other in terms of size, on-resistance, off-resistance, and capacitance. High similarity in those parameters can lead to small offset, because the offset component generally depends on the capacitance of switch elements as well as the capacitance at intersects of signal lines described later and the capacitance of the conversion elements. However, taking into account a time-dependent offset characteristic described later, the second switch element may be different in size, on-resistance, off-resistance, and capacitance from the first switch element. This also applies to resistance and capacitance between a first signal line and a second signal line described later.

The other electrode of the conversion element 101 is electrically connected to a bias voltage source 109 via a common bias line BL so that a bias voltage Vs is applied therethrough to each conversion element 101.

A plurality of first switch elements 102 are electrically connected in a row direction as follows. That is, a control terminal of each first switch element 102 located in each row n are electrically connected in common to a first driving line Gtn (where n=1, 2, 3 . . . ) such that a first driving signal supplied from a first driving circuit 104 is applied via the first driving line Gtn to the first switch elements 102 in the row n thereby controlling the on-state of the first switch elements 102 in the row direction in a row-by-row basis.

A plurality of second switch elements 103 are electrically connected in the row direction as follows. That is, a control terminal of each second switch element 103 located in each row n is electrically connected in common to a second driving line Gon such that a second driving signal supplied from a second driving circuit 105 is applied via the second driving line Gon to the second switch elements 103 located in the row n thereby controlling the on-state of the second switch elements 103 in the row direction in a row-by-row basis.

The other main terminal of each first switch element 102 is electrically connected such that the other main terminals of first switch elements 102 located in each column m are electrically connected in common to a first signal line SLm (where m=1, 2, 3 . . . ) so that when a corresponding first switch element 102 is in an on-state, an electric signal corresponding to the electric charge on the conversion element 101 is output to a first reading circuit 106 via the first signal line SLm.

Via a plurality of first signal lines SL1 to SL3 extending in the column direction, electric signals output from a plurality of pixels are transmitted in parallel to the first reading circuit 106.

On the other hand, a plurality of second switch elements 103 are connected in the column direction as follows. The other main terminal of each of second switch elements 103 located in each column m is connected in common to a second signal line OLm so that when the second switch elements 103 are in an on-state, an offset correction electric signal is output to a second reading circuit 107 via the second signal line OLm.

Offset correction electric signals output from a plurality of pixels are transmitted to the second reading circuit 107 via a plurality of second signal lines OL1 to OL3 extending in the column direction. In accordance with a control signal supplied from a control unit 110, the first driving circuit 104 outputs driving signals φGt to the respective first driving lines wherein the driving signals each can have either an on-voltage that causes the first switch elements 102 to turn on or an off-voltage that causes the first switch elements 102 to turn off, whereby the first driving circuit 104 controls the on/off-state of each first switch element 102 thereby driving the detection unit 100.

On the other hand, in accordance with a control signal supplied from the control unit 110, the second driving circuit 105 outputs driving signals φGo to the respective second driving lines wherein the driving signals φGo each can have either an on-voltage that causes the second switch elements 103 to turn on or an off-voltage that causes the second switch elements 103 to turn off, whereby the second driving circuit 105 controls the on/off-state of each second switch element 103. That is, the control unit 110 controls the operation of the detection unit 100.

The first reading circuit 106 amplifies the electric signals received in parallel via the first signal lines SL1 to SL3 and performs a sample-and-hold operation on the amplified signals. The first reading circuit 106 then converts the sampled-and-held parallel electric signals into a serial signal and outputs the resultant serial signal as an image signal. Furthermore, the first reading circuit 106 converts the output image signal from an analog form into a digital form and outputs resultant image data to a signal processing unit 108. The second reading circuit 107 amplifies the offset correction electric signals received in parallel via the second signal lines OL1 to OL3 and also performs a sample-and-hold operation on amplified signals. The second reading circuit 107 then converts the sampled-and-held parallel electric signals into a serial signal and outputs the resultant serial signal as an offset correction image signal. The second reading circuit 107 converts the output offset correction image signal from an analog form into a digital form and outputs resultant offset image data to a signal processing unit 108.

The signal processing unit 108 performs an offset correction on the image data using the acquired correction image data. The detailed configuration of the signal processing unit 108 and the detailed process performed by the signal processing unit 108 will be described later.

In the present embodiment, the first reading circuit 106, the second reading circuit 107, and the signal processing unit 108 form a correction unit. In the present embodiment, the first reading circuit 106 and the second reading circuit 107 may be the same in terms of circuit configuration so that there is substantially no difference in noise included in the signal output path between the first reading circuit 106 and the second reading circuit 107.

Figure 1B:
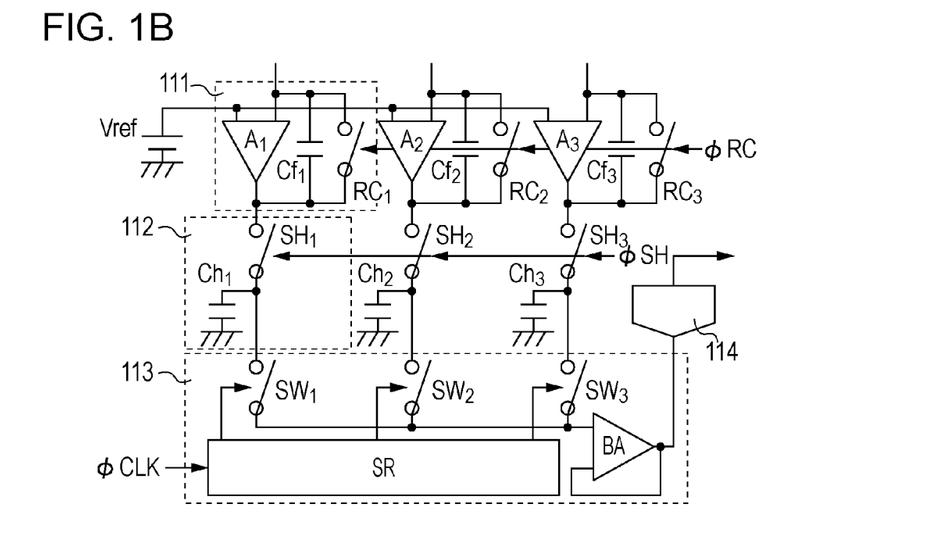

Referring to FIG. 1B, a reading circuit applicable to the first and second reading circuits is described below. The reading circuit includes amplifiers that are disposed for respective first signal lines SLm or the respective second signal lines OLm such that each amplifier amplifies corresponding one of the electric signals output in parallel from the detection unit 100.

Each amplifier includes an integrating amplifier 111 configured to amplify an input electric signal and a sample-and-hold circuit 112 configured to sample and hold the amplified electric signal. The integrating amplifier 111 includes an operational amplifier A configured to amplify the input electric signal, an integrating capacitor Cf, and a reset switch RC. The gain of the integrating amplifier 203 may be adjusted by adjusting the capacitance of the integrating capacitor Cf. An inverting input terminal of the operational amplifier A is applied with the input electric signal, while a non-inverting input terminal of the operational amplifier A is applied with a reference voltage Vref. The resultant amplified electric signal is output from an output terminal of the operational amplifier A. Note that the integrating capacitor Cf is disposed between the inverting input terminal and the output terminal of the operational amplifier A.

Each sample-and-hold circuit 112 disposed for a corresponding one of the amplifiers includes a sampling switch SH and a sampling capacitor Ch. The reading circuit also includes a multiplexer 113 and an analog-to-digital converter 114. The multiplexer 113 is configured to sequentially output electric signals supplied in parallel from the respective amplifiers thereby outputting a serial image signal. The analog-to-digital converter 114 is configured to convert the output image signal into digital image data. The multiplexer 113 includes output switches SW1 to SW3, a shift register SR functioning as a scanning circuit, and a buffer amplifier BA. The reset switch RC, the sampling switch SH, and the multiplexer 113 are controlled by respective control signals φRC, φSH, and φCLK supplied from the control unit 106. The analog-to-digital converter 114 is also controlled by a control signal supplied from the control unit 106.

Next, referring to FIG. 2, an operation of the image pickup apparatus according to the first embodiment of the present invention is described below.

Figure 2:
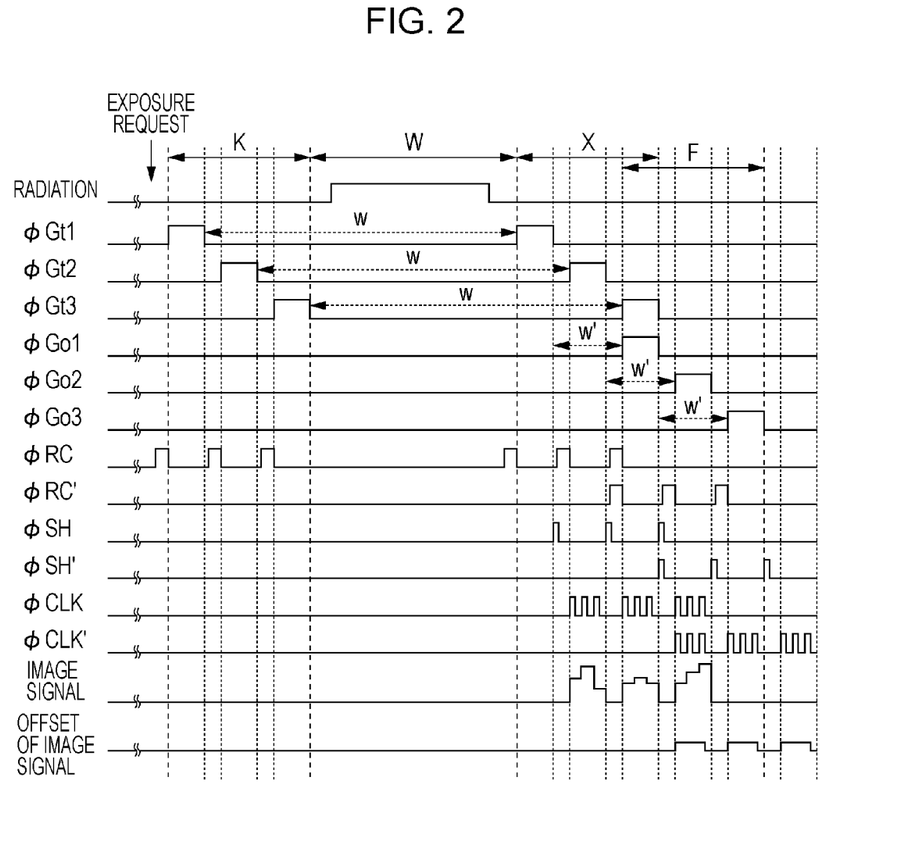
FIG. 2 is a timing chart illustrating an operation of an image pickup apparatus according to an embodiment of the present invention.

In FIG. 2, the control signals supplied to the first reading circuit 106 are denoted by φRC, φSH, and φCLK, and the control signals supplied to the second reading circuit 107 are denoted by φRC', φSH', and φCLK'.

If the control unit 110 receives an exposure request signal, the control unit 110 issues a control signal. In response to the control signal, the image pickup apparatus performs an initialization K. In the initialization period, conversion elements 101 are initialized by applying an initial bias to each conversion element before an accumulation operation is started. More specifically, in the initialization K, the integrating capacitor and the first signal line are first reset by the reset switch in the first reading circuit, and an on-voltage is applied to the driving line Gt1 from the first driving circuit 104 thereby turning on first switch elements of pixels in a first row. By turning on the first switch elements, corresponding conversion elements are initialized. As a result, an electric charge existing on each conversion element is output in the form of an electric signal via a corresponding first switch element.

However, in the present embodiment, the sample-and-hold circuit and other following circuit elements in the first reading circuit 106 are inactive, and thus no data corresponding to the electric signal is output from the first reading circuit 106. When the integrating capacitor and the signal line are reset thereafter, the electric signal is treated. The turning-on of the first switch element and resetting of the integrating capacitor and the signal line are performed for each row.

If the above-described process is performed for all three rows, the initialization of the detection unit 100 is complete.

Note that in the initialization process described above, the reset switch may be maintained in the on-state at least during the on-period of the first switch element to continue the resetting process. Note that the initialization K is performed in a period that starts when the first switch elements in the first row are turned on and that ends when the first switch elements in the third row are turned off.

Next, the image pickup apparatus performs an accumulation operation W during a period corresponding to a radiation exposure period. In the accumulation operation W, the conversion elements 101 are applied with the bias voltage Vs. While the conversion elements 101 are maintained in this state, the off-voltage is applied to the first switch elements 102 and the second switch elements 103 such that the first switch elements 102 and the second switch elements 103 of all pixels are turned off. In this state, the conversion elements 101 are exposed to radiation. As a result, the conversion elements 101 generate electric charges corresponding to the amount of the radiation.

Note that the period of the accumulation operation W is defined as a period in which the first switch elements 102 and the second switch element s 103 of all pixels are in the off-state.

Next, the image pickup apparatus performs an image output operation X to output electric signals based on electric charges generated in the accumulation operation W. More specifically, in the image output operation according to the present embodiment of the invention, the integrating capacitor and the first signal line are reset and the on-voltage is supplied to the first driving line Gt1 from the first driving circuit 104 such that the first switch elements in the first row are turned on. As a result, the electric signals based on the electric charges generated in the conversion elements in the first row are output to corresponding first signal lines. The electric signals output in parallel via the first signal lines are amplified by corresponding integrating amplifiers in the first reading circuit 106.

The sample-and-hold circuits operate in response to the control signal φSH such that the amplified electric signals are held in parallel in the respective sample-and-hold circuits.

After the first switch elements are turned off and the electric signals are held, the integrating capacitors and the first signal lines are reset. After the resetting, the on-voltage is applied to the first driving line Gt2 in the second row in a similar manner to the first row such that the first switch elements in the second row are turned on.

During a period in which first switch elements in the second row are in the on-state, the multiplexer sequentially outputs the electric signals held in the sample-and-hold circuit such that the electric signals read in parallel from the pixels in the first row are converted into a serial image signal. The serial image signal is then converted by the analog-to-digital converter into image data of the first row. The resultant image data is output from the first reading circuit 106.

By performing the above operation for each of the first to third rows on a row-by-row basis, one frame of image data is output from the first reading circuit 106.

The image output operation X is performed at the same operation speed and during the same period as those of the initialization K. More specifically, the period of the image output operation X starts when the first switch elements in the first row are turned on and ends when the first switch elements in the third row are turned off.

In the present embodiment, in the period during which the image output operation X is performed, the image pickup apparatus starts an offset output operation F to output an offset correction electric signal from pixels. That is, in the present embodiment, the image pickup apparatus performs the offset output operation F such that the image output operation X and the offset output operation F partially overlap in time each other. More specifically, in the present embodiment, in the period in which the first switch elements in the second row are in the on-state and the integrating capacitors and the first signal lines are reset, the integrating capacitors and the second signal lines of the second reading circuit 107 are reset.

Furthermore, in the period in which the first switch elements in the third row are in the on-state, the on-voltage is supplied to the second driving line Go1 from the second driving circuit 105 thereby turning on the second switch elements in the first row. That is, in the period in which the first switch elements are in the off-state for particular pixels from which electric signals have been already output as image signals, the second switch elements associated with these particular pixels are turned on whereby offset correction electric signals based on the electric charges generated in the conversion elements in the first row are output to the corresponding second signal lines.

The electric signals output in parallel via the second signal lines are amplified by corresponding integrating amplifiers in the second reading circuit 107. Corresponding sample-and-hold circuits operate in response to a control signal φSH' such that the amplified electric signals are held in parallel in the respective sample-and-hold circuits.

After the second switch elements are turned off and the electric signals are held, the integrating capacitors and the second signal lines are reset.

After the resetting, the on-voltage is applied to the second driving line Go2 in the second row in a similar manner to the first row thereby turning on the second switch elements in the second row. During a period in which second switch elements in the second row are in the on-state, the multiplexer sequentially outputs the electric signals held in the sample-and-hold circuit such that the offset correction electric signals read in parallel from the pixels in the first row are converted into a serial correction image signal.

The serial correction image signal is then converted by the analog-to-digital converter into correction image data of the one row. The resultant offset image data is output from the second reading circuit 107.

By performing the above operation for each of the first to third rows on a row-by-row basis, correction image data of one frame is output from the second reading circuit 107.

Note that the operation speed and the length of the period of the offset output operation F are same as those of the initialization K and the image output operation X. More specifically, the period of the offset output operation F starts when the second switch elements in the first row are turned on and ends when the second switch elements in the third row are turned off.

In the image pickup apparatus, by performing the above-described operation, the acquisition of the correction image signal for one frame is performed during the period that partially overlaps the period in which the image signal for the one frame is acquired from the detection unit.

If an accumulation time during which an electric signal associated with an image signal is generated by a conversion element is denoted by a first accumulation time w, the first accumulation time w is equal for all rows. If an accumulation time during which an offset correction electric signal is generated by a conversion element is denoted by a second accumulation time w', the second accumulation time w' is also equal for all rows. The offset depends on the length of the accumulation time. Therefore, the offset added to the image signal is not influenced by the accumulation time varying in the column direction but is equally influenced by the accumulation time as a whole of the image signal. Similarly, the offset correction electric signal is not influenced by the accumulation time varying in the column direction but is equally influenced by the accumulation time as a whole of the image signal.

Therefore, the corrected image data obtained as a result of the offset correction process (described later) performed by the signal processing unit 108 is not influenced by the accumulation time varying in the column direction, and thus good correction can be achieved.

In the present embodiment, although the offset output operation F is started with a delay corresponding to two rows after the image output operation X is started, the delay is not limited to the two rows. For example, the delay may be one row. The shorter the delay in the start of the offset output operation F, the shorter the time needed to acquire offset image data. However, a corresponding reduction occurs in the accumulation time in which the offset correction electric signal is obtained. As a result, the obtained correction image data includes less offset that depends on the accumulation time, which can makes it difficult to achieve high accuracy in the offset correction. Therefore, the delay in the start of the offset output operation F may be determined taking into account both the acquisition time and the correction accuracy.

Figure 3:
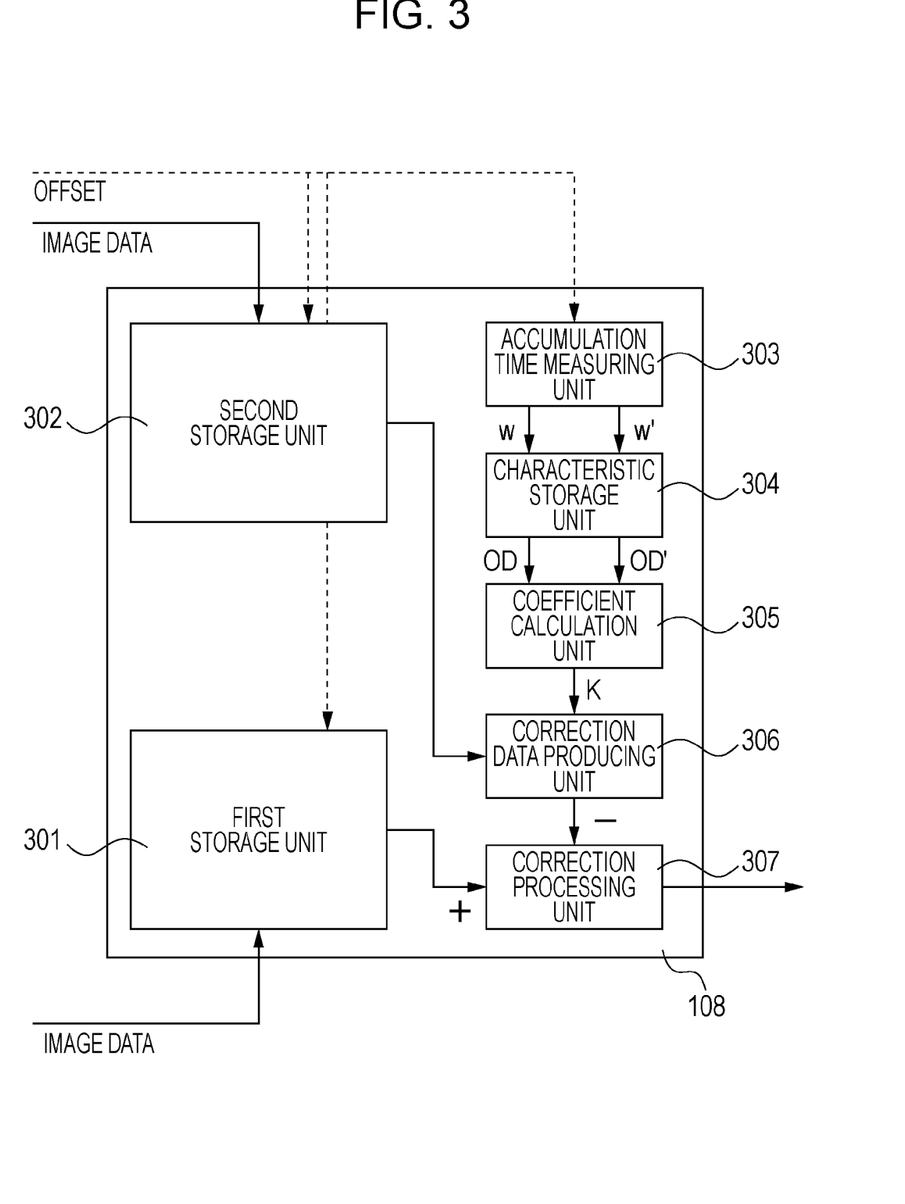
FIG. 3 is a block diagram illustrating a signal processing unit according to an embodiment of the present invention.

Next, referring to FIG. 3, the offset correction process performed by the signal processing unit 108 according to the present embodiment is described below.

The signal processing unit 108 includes a first storage unit 301, a second storage unit 302, an accumulation time measuring unit 303, a characteristic storage unit 304, a coefficient calculation unit 305, a correction data producing unit 306, and correction processing unit 307. The first storage unit 301 stores image data supplied from the first reading circuit 106. The second storage unit 302 stores the correction image data supplied from the second reading circuit 107. The first storage unit 301 and the second storage unit 302 are capable of outputting the stored data as required in response to a control signal from the control unit 110. The accumulation time measuring unit 303 measures the first accumulation time w and the second accumulation time w' according to a control signal from the control unit 110, and outputs measured values of the first accumulation time w and the second accumulation time w' to the characteristic storage unit 304. The characteristic storage unit 304 stores a time-dependent offset characteristic of the detection unit 100, and outputs first offset characteristic data OD associated with the first accumulation time w and second offset characteristic data OD' associated with the second accumulation time w' to the coefficient calculation unit 305.

The coefficient calculation unit 305 calculates a coefficient K using the first offset characteristic data OD and second offset characteristic data OD'. More specifically, for example, the coefficient K is calculated by dividing the first offset characteristic data OD by the second offset characteristic data OD'. The coefficient calculation unit 305 outputs the calculated coefficient K to the correction data producing unit 306.

The correction data producing unit 306 then produces offset correction data by performing a calculation using the coefficient K and the correction image data acquired from the second storage unit 302. More specifically, for example, the offset correction data is produced by multiplying the correction image data by the coefficient K. The correction data producing unit 306 outputs the produced offset correction data to the correction processing unit 307.

The correction processing unit 307 corrects the offset using offset correction data acquired from the correction data producing unit 306 and the image data acquired from the first storage unit 301. More specifically, for example, the offset correction data is subtracted from the image data thereby correcting the image data in terms of the offset. As a result, corrected image data is obtained. The correction processing unit 307 outputs the resultant corrected image data to a control computer (not shown). As a result of the offset correction process performed in the above-described manner by the signal processing unit 108, offset correction is performed for each pixel based on two electric signals that are output from the same pixel, i.e., the electric signal indicating the image signal and the electric signal indicating the offset correction signal.

Furthermore, it is possible to obtain substantially equal time-dependent offset characteristic for both image data and the correction image data, this makes it possible to perform a further more precise offset correction.

In the present embodiment of the invention, the time-dependent offset characteristic may be described for each pixel or the average time-dependent offset characteristic of the whole detection unit may be described.

As described above, in the present embodiment of the invention, it is possible to perform high-precision offset correction without being influenced by a change in accumulation time in the column direction. Furthermore, in the present embodiment, it is possible to achieve substantially equal time-dependent offset characteristic for both the image data and the correction image data, which makes it possible to achieve further more accuracy in the offset correction.

Second Embodiment

Figure 4A:
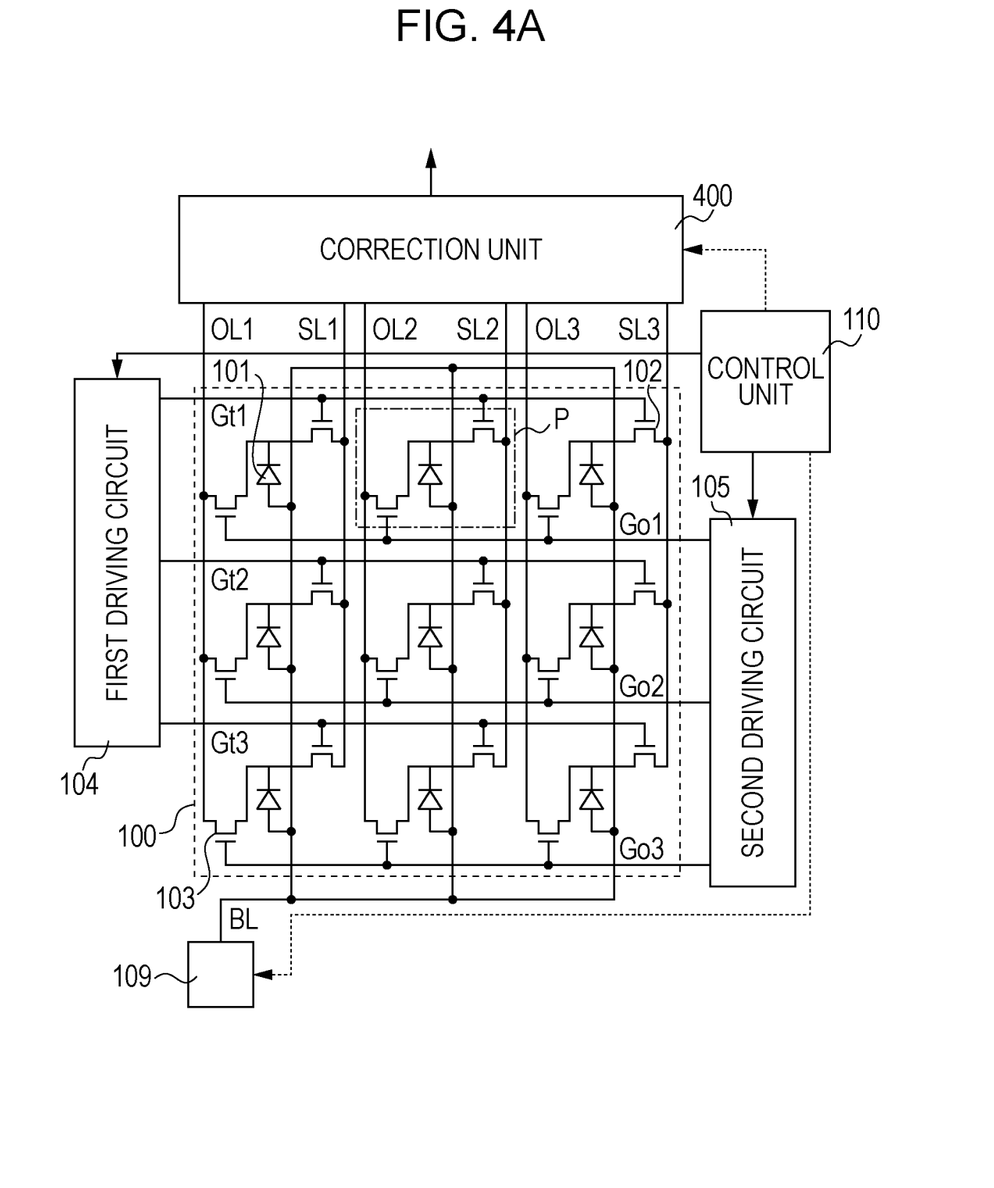
FIGS. 4A and 4B are equivalent circuit diagrams of an image pickup apparatus according to an embodiment of the present invention.

Referring to FIG. 4A, an image pickup apparatus according to a second embodiment of the present invention is described below. In FIG. 4A, similar elements to those according to the first embodiment are denoted by similar reference numerals, and a further description thereof is omitted.

In the first embodiment described above, the signal processing unit 108 performs the correction process using the digital data output from the first reading circuit 106 and the digital data output from the second reading circuit 107. In the second embodiment, a correction unit 400 performs a correction process using an analog signal.

That is, in the present embodiment, the correction unit 400 is used instead of the first reading circuit 106, and the second reading circuit 107, and the signal processing unit 108 used in the first embodiment.

Figure 4B:
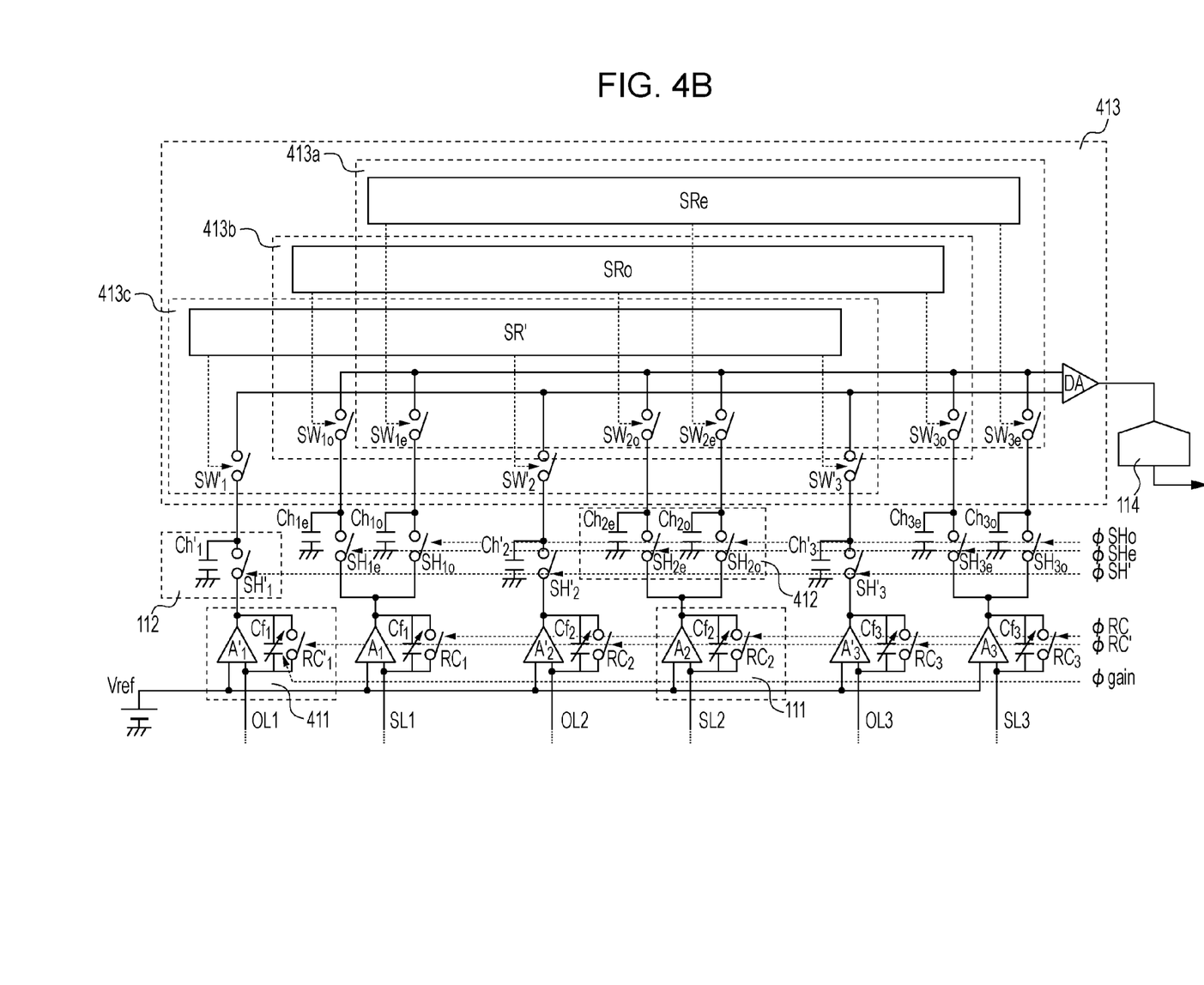

Referring to FIG. 4B, the correction unit 400 according to the present embodiment is described below. In FIG. 4B, each circuit element associated with the offset correction electric signal is denoted by a reference symbol with a prime.

In the present embodiment, as in the first embodiment, each first signal line SL is electrically connected to a corresponding integrating amplifier 111. On the other hand, each second signal line OL is electrically connected to a corresponding integrating amplifier 411 whose gain is variable in accordance with a control signal φgain supplied from the control unit 106.

An offset correction electric signal output from the integrating amplifier 411 is temporarily stored in a sample-and-hold circuit 112 as in the first embodiment. An electric signal output from the integrating amplifier 111 is temporarily stored in an odd-numbered-row sample-and-hold circuit including a sampling switch SHo and a sampling capacitor Cho or an even-numbered-row sample-and-hold circuit including a sampling switch SHe and a sampling capacitor Che.

A plural-row sample-and-hold circuit 412 includes the odd-numbered-row sample-and-hold circuit and the even-numbered-row sample-and-hold circuit. That is, in the present embodiment, a plurality of sample-and-hold circuits are disposed for the electric signal output from the first switch elements so that the electric signal is selectively stored in one of the sample-and-hold circuit in accordance with a control signal supplied from a control unit whereby it becomes possible to output an image signal with a delay corresponding to a specified number of rows.

In the present embodiment, parallel offset correction electric signals are converted into a serial correction image signal via output switches SW'1 to SW'3 that are scanned by a shift register SR'. On the other hand, parallel electric signals corresponding to converted electric charges are converted into a serial image signal via odd-numbered-row output switches SWo1 to SWo3 that are scanned by a shift register SRo and even-numbered-row output switches SWe1 to SWe3 that are scanned by a shift register SRe.

A differential amplifier DA is disposed such that the image signal and the correction image signal are differentially amplified by the differential amplifier DA and a resultant image signal is input to an analog-to-digital converter 114.

That is, in the present embodiment, an odd-numbered-row multiplexer 413a includes the odd-numbered-row output switches SWo1 to SWo3, and an even-numbered-row multiplexer 413b includes the even-numbered-row output switches SWe1 to SWe3. A correction multiplexer 413c includes the output switches SW'1 to SW'3. A multiplexer 413 includes the odd-numbered-row multiplexer 413a, the even-numbered-row multiplexer 413b, the correction multiplexer 413c, and the differential amplifier DA serving as a differential circuit. The control unit 110 controls the respective multiplexers.

Figure 5:
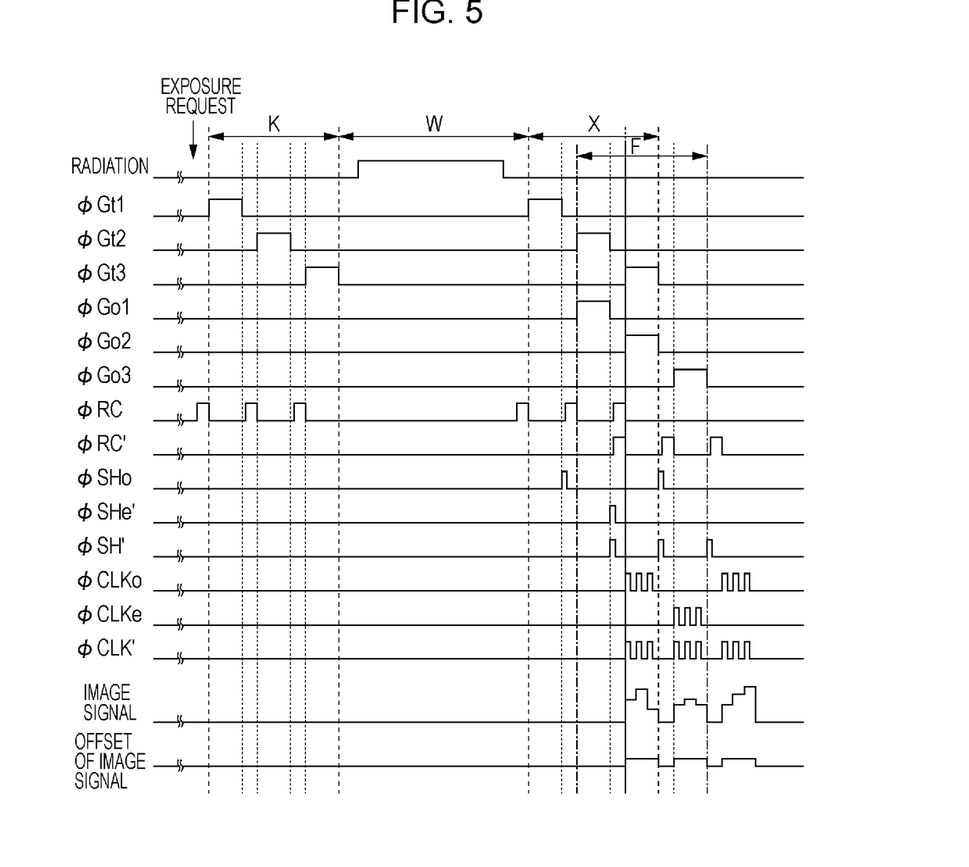
FIG. 5 is a timing chart illustrating an operation of an image pickup apparatus according to an embodiment of the present invention.

Next, referring to FIG. 5, an operation of the image pickup apparatus according to the present embodiment of the present invention is described below. In the present embodiment, as can be seen from FIG. 5, an initialization K and an accumulation operation W are performed in a similar manner to the first embodiment described above with reference to FIG. 2, and thus a further description thereof is omitted. Note that descriptions of other similar operations are also omitted.

In an image output operation according to the present embodiment of the invention, electric signals based on electric charges generated in conversion elements in the first row are output in parallel via the respective first signal lines and the integrating amplifiers 111 and held in parallel in the odd-numbered-row sample-and-hold circuits in accordance with a control signal φSHo. Similarly, electric signals based on electric charges generated in conversion elements in the second row are output in parallel via the respective first signal lines and the integrating amplifiers 111 and held in parallel in the even-numbered-row sample-and-hold circuits in accordance with a control signal φSHe.

Thereafter, the on-voltage is applied to the first driving line Gt3 in the third row thereby turning on the first switch elements in the third row. During a period in which first switch elements in the third row are in the on-state, the odd-numbered-row multiplexer 413a sequentially outputs the electric signals held in the odd-numbered-row sample-and-hold circuit such that the electric signals read in parallel from the pixels in the first row are converted into a serial image signal and output to one terminal of the differential amplifier DA.

By performing the above operation for each of the first to third rows on a row-by-row basis, one frame of image signal is output to the one terminal of the differential amplifier DA.

As in the first embodiment, in the period during which the image output operation X is performed, the image pickup apparatus starts an offset output operation F to output an offset correction electric signal from pixels.

In the present embodiment, during a period in which first switch elements in the second row are in the on-state, the on-voltage is supplied to the second driving line Go1 from the second driving circuit 105 thereby turning on the second switch elements in the first row whereby offset correction electric signals based on the electric charges generated in the conversion elements in the first row are output to the corresponding second signal lines.

The electric signals output in parallel via the second signal lines are amplified by corresponding variable-gain integrating amplifiers 411. As in the first embodiment, the control unit 110 adjusts the gain of the integrating amplifier 411 via a control signal φgain based on the time-dependent offset characteristic.

That is, in the present embodiment, the control unit 110 has functions corresponding to the functions of the accumulation time measuring unit 303, the characteristic storage unit 304, and the coefficient calculation unit 305 used in the first embodiment, whereby the control unit 110 properly adjusts the gain of the integrating amplifier 411 via the control signal φgain.

The sample-and-hold circuits 112' operate in accordance with the control signal φSH' such that the amplified electric signals are held in parallel in the respective sample-and-hold circuits 112'. That is, when the electric signals are read from the conversion elements in the second row, the offset correction electric signals are also output from the conversion elements in the first row.

Thereafter, in a period in which the odd-numbered-row multiplexer 413a outputs the image signal in the first row, the correction multiplexer 413c sequentially outputs the electric signals held in the sample-and-hold circuit. In this process, the correction multiplexer 413c operates in synchronization with the odd-numbered-row multiplexer 413a such that output switches in the same column are selected in the same order whereby the offset correction electric signals read in parallel from the pixels in the first row are converted into a serial correction image signal and output to the other terminal of the differential amplifier DA in synchronization with the image signal.

By performing the above operation for each of the first to third rows on a row-by-row basis, one frame of offset image signal is input to the other terminal of the differential amplifier DA at the same time as the image signal is input to the one terminal of the differential amplifier DA. That is, by performing the above-described operation, the electric signal serving as the image signal and the electric signal serving as the offset correction signal output from the same pixel as the pixel of the image signal are substantially simultaneously input to the differential amplifier DA.

As a result of differential amplification performed by the differential amplifier DA, offset correction process is performed on the image signal. A resultant corrected image signal is output to the analog-to-digital converter 114. The analog-to-digital converter 114 outputs corrected image data.

In the present embodiment, it is possible to configure the image pickup apparatus in a simpler manner than in the first embodiment, and it is possible to perform the signal processing in a simpler manner than in the first embodiment.

Third Embodiment

Figure 6:
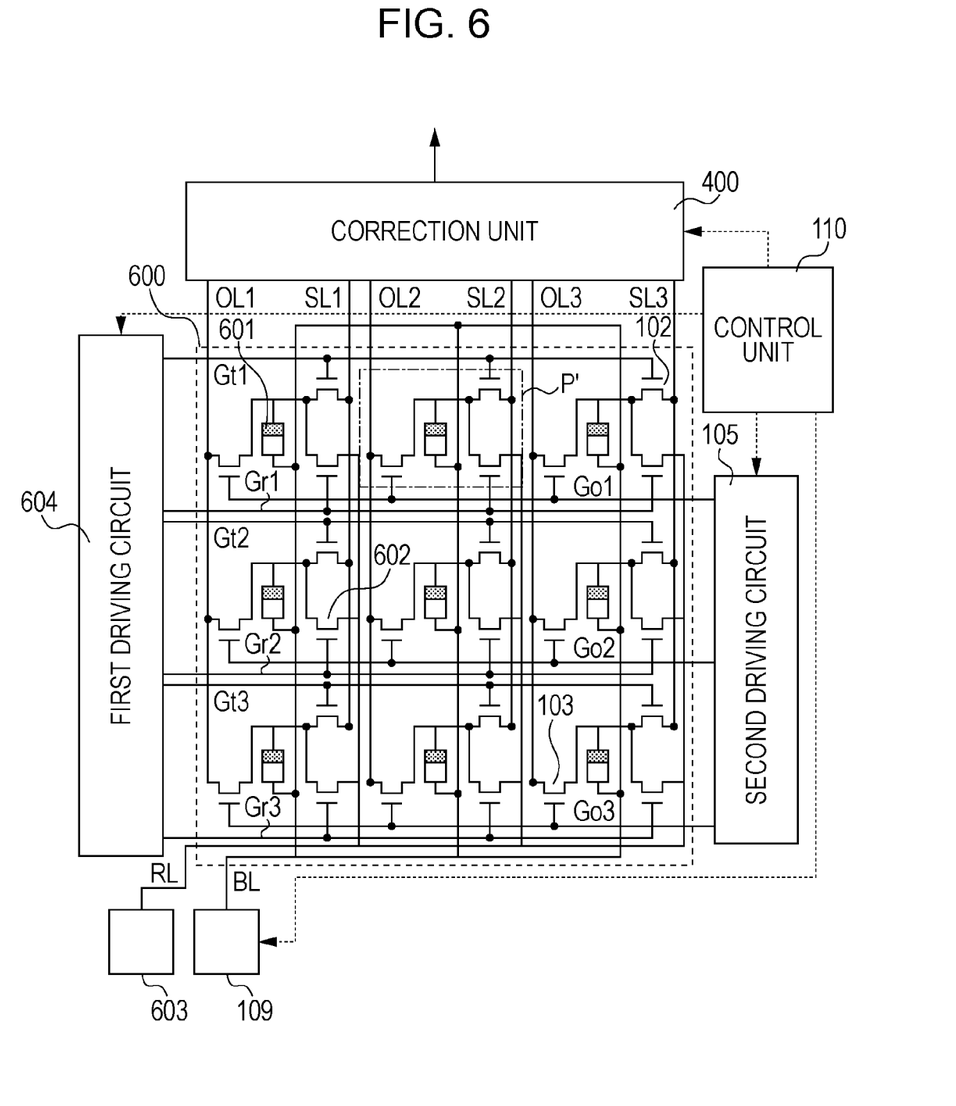
FIG. 6 is an equivalent circuit diagram of an image pickup apparatus according to an embodiment of the present invention.

Referring to FIG. 6, an image pickup apparatus 600 according to a third embodiment of the present invention is described below. In FIG. 6, similar elements to those according to the second embodiment are denoted by similar reference numerals, and a further description thereof is omitted. In the third embodiment, a conversion element 601 including a MIS (metal-insulator-semiconductor)-type photoelectric conversion element is employed instead of the conversion element 101 using the PIN-type photodiode. Furthermore, each pixel P' further includes a third switch element 602 used to refresh the MIS-type photoelectric conversion element.

The third switch elements 602 of the respective pixels are connected together via a refresh line RL to a refresh voltage source 603 that provides a refresh voltage Vr. In the present embodiment, a plurality of third switch elements 602 located in the row direction are electrically connected such that a control terminal of each third switch element 602 located in each row is electrically connected in common to a third driving line Gr. As with the first switch elements, a third driving signal supplied from a first driving circuit 604 is applied via the third driving line Gr to the third switch elements 602 in each row thereby controlling the turning-on of the third switch elements 602 in the row.

Figure 7:
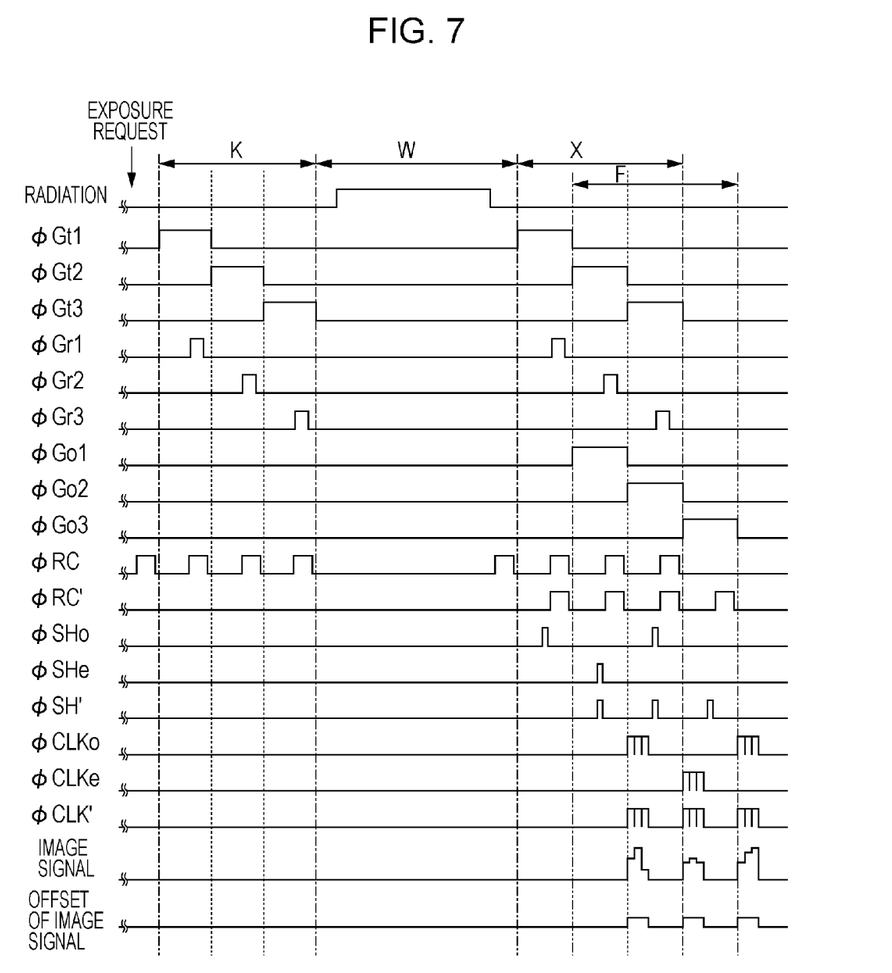
FIG. 7 is a timing chart illustrating an operation of an image pickup apparatus according to an embodiment of the present invention.

Next, referring to FIG. 7, an operation of the image pickup apparatus according to the present embodiment of the present invention is described below. In the present embodiment, as can be seen from FIG. 7, an accumulation operation W is performed in a similar manner to the previous embodiment, and thus a further description thereof is omitted. Note that descriptions of other similar operations are also omitted.

In the present embodiment, the initialization and the image output operation are performed as follows. That is, the integrating capacitor and the first signal line are reset and the on-voltage is supplied to the first driving line Gt from the first driving circuit 604 to turn on the first switch elements. As a result, electric signals based on electric charges generated in conversion elements in a particular row are output to corresponding first signal lines.

The electric signals output in parallel via the first signal lines are amplified by corresponding integrating amplifiers. In accordance with a control signal φSHo or φSHe, the odd-numbered-row sample-and-hold circuits or the even-numbered-row sample-and-hold circuits operates such that the amplified electric signals are held in parallel in the respective sample-and-hold circuits.

After the electric signals are held, while the first switch elements are maintained in the on-state, resetting of the integrating capacitors and the first signal lines is started, and the on-voltage is supplied to the third driving line Gr from the first driving circuit 604 to turn on the third switch elements whereby the conversion elements 601 are refreshed.

Thereafter, the third switch elements are turned off and the refreshing is ended. Subsequently, the first switch elements are turned off.

Similarly, in the offset output operation, the integrating capacitor and the first signal line are reset, and the on-voltage is supplied to the first driving line Go from the second driving circuit 105 to turn on the first switch elements. As a result, offset correction electric signals based on electric charges generated electric charges in the conversion elements in the particular row are output to the corresponding second signal lines.

The electric signals output in parallel via the second signal lines are amplified by corresponding variable-gain integrating amplifiers. Corresponding sample-and-hold circuits operate in response to a control signal φSH' such that the amplified electric signals are held in parallel in the respective sample-and-hold circuits.

After the electric signals are held, while the second switch elements are maintained in the on-state, resetting of the integrating capacitors and the second signal lines is started, and the on-voltage is supplied to the second driving line Gr from the second driving circuit 105 to turn on the third switch elements whereby the conversion elements 601 are refreshed.

Thereafter, the third switch elements are turned off and the refreshing is ended. Subsequently, the second switch elements are turned off.

As described above, the image pickup apparatus using MIS-type photoelectric conversion elements according to the present embodiment is capable of acquiring correction image data in a short time without a significant reduction in frame rate and performing good offset correction.

Fourth Embodiment

Next, referring to FIG. 8, an example of a radiation image pickup system using an image pickup apparatus according to an embodiment of the present invention is described below.

Figure 8:
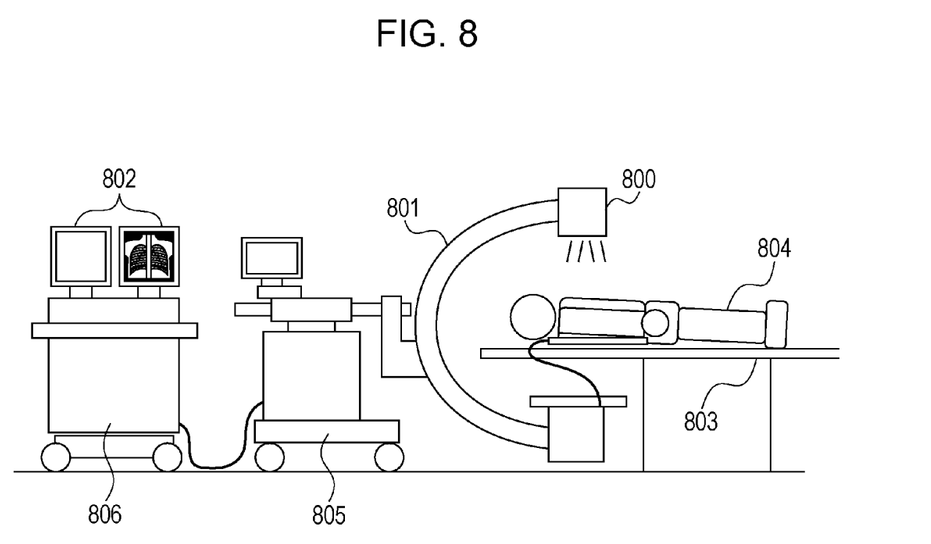
FIG. 8 is a schematic diagram illustrating an image pickup system according to an embodiment of the present invention.

FIG. 8 schematically illustrates an image pickup system using a portable image pickup apparatus capable of taking a still or moving image of a subject. In FIG. 8, reference numeral 800 denotes a radiation generating apparatus. Reference numeral 801 denotes a C-shaped arm functioning as a holding unit that holds the image pickup apparatus. Reference numeral 805 denotes a portable control apparatus which includes a carriage that makes it possible to carry and control the radiation generating apparatus 800, the image pickup apparatus, and the C-shaped arm 801. Reference numeral 803 denotes an examination bed on which a subject 804 is put. The portable control apparatus 805 is configured to control the units described above. Reference numeral 806 denotes a processing apparatus configured to display an image in a display apparatus 802 according to an image signal obtained by the image pickup apparatus.

The control apparatus 805 includes a control computer, a control console, a radiation control apparatus, etc., and the control apparatus 805 is configured to be capable of processing the image signal obtained by the image pickup apparatus and transmitting resultant image data to the display apparatus 806 or other apparatus.

The image data produced as a result of the image processing performed by the control apparatus 805 may be transmitted to a remote place via a transmission unit/system such as a telephone system. This makes it possible for a doctor at the remote place to make a diagnosis according to an image based on the transmitted image data.

It is also possible to record the transmitted image on a film or store the image in a storage medium such as an optical disk.

The image pickup system may be configured such that the image pickup apparatus may be removable from the C-shaped arm 801 and the radiation generating apparatus 800 of the C-shaped arm 801 may be replaced with another radiation generating apparatus to take an image.

As described above, by applying the image pickup apparatus according to one of the embodiments to the radiation image pickup system, it is possible to achieve the radiation image pickup system capable of acquiring an image signal with a high signal-to-noise ratio in a desired frame time.

The signal processing unit 108 and the control unit 110 according to the first embodiment may be disposed in the control apparatus 805.

In the processing steps performed by the control unit 110 according to one of the embodiments may be performed by a computer disposed in the control unit 110 by executing a program. In this case, the program and associated data may be stored in the control unit 110.

It is to be understood that a storage medium or a communication medium used to supply the program to a computer is one of embodiments according to the present invention. A specific example of such a computer-readable storage medium such as a CD-ROM disk on which the program is stored, and a specific example of a communication medium is a communication network system such as the Internet via which the program is transmitted.

It is also to be understood that a computer program product including a computer-readable storage medium on which the program is stored is an embodiment of the present invention.

That is, the program, the storage medium, the transmission medium, and the computer program produce fall within the scope of the present invention.

Examples of storage media include, in addition to the CD-ROM disk described above, a flexible disk, a hard disk, an optical disk, a magneto-optical disk, a magnetic tape, a non-volatile memory card, a ROM, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-276830 filed Dec. 4, 2009, which is hereby incorporated by reference herein in its entirety.

What is claimed is:

1. An image pickup apparatus comprising:
    a detection unit including a plurality of pixels arranged in a matrix of rows and columns, each pixel including a conversion element configured to convert radiation or light into an electric charge, a first switch element configured to output an electric signal corresponding to the electric charge, and a second switch element that is electrically connected to the conversion element and that is configured to output a correction electric signal;
    a correction unit configured to perform a correction process based on the electric signal output via the first switch element of a particular pixel and the correction electric signal output via the second switch element of the particular pixel; and
    a control unit configured to control an operation of the detection unit such that a correction image signal based on the correction electric signal output via the second switch element is acquired in a period that partially overlaps in time a period in which an image signal based on the electric signal output via the first switch element is acquired, and such that, when the electric signal associated with the image signal is output for the particular pixel, the second switch element of the particular pixel is controlled to be in an on-state over a period during which the first switch element of the particular pixel is in an off-state.

2. The image pickup apparatus according to claim 1, wherein the correction unit includes:
    a first reading circuit configured to output image data based on the electric signal output via the first switch element;
    a second reading circuit configured to output correction image data based on the correction electric signal output via the second switch element; and
    a signal processing unit configured to perform a correction process based on the image data and the correction image data.

3. The image pickup apparatus according to claim 2, wherein the signal processing unit includes:
    a first storage unit configured to store the image data;
    a second storage unit configured to store the correction image data;
    an accumulation time measuring unit configured to measure a first accumulation time corresponding to the image data and a second accumulation time corresponding to the correction image data;
    a characteristic storage unit configured to store a time-dependent offset characteristic of the detection unit and output first offset characteristic data corresponding to the first accumulation time and second offset characteristic data corresponding to the second accumulation time;
    a coefficient calculation unit configured to calculate a coefficient using the first offset characteristic data and the second offset characteristic data;
    a correction data producing unit configured to produce correction data using the correction image data and the coefficient; and
    a correction processing unit configured to perform a correction process using the image data and the correction data.

4. The image pickup apparatus according to claim 3, wherein:
    the coefficient calculation unit calculates the coefficient by dividing the first offset characteristic data by the second offset characteristic data;
    the correction data producing unit produces the correction data by multiplying the correction image data by the coefficient; and
    the correction processing unit produces the corrected image data by subtracting the correction data from the image data.

5. The image pickup apparatus according to claim 1, wherein the correction unit includes a differential circuit configured to differentially process the image signal and the correction image signal.

6. The image pickup apparatus according to claim 5, wherein:
    the correction unit includes a plurality of sample-and-hold circuits for the electric signal output via the first switch element,
    and wherein the control unit controls the plurality of sample-and-hold circuits such that the electric signal output via the first switch element is selectively held by one of the plurality of sample-and-hold circuits.

7. The image pickup apparatus according to claim 5, wherein:
    the correction unit includes a gain-variable amplifier configured to amplify the electric signal output via the second switch element,
    and wherein the control unit controls the gain of the amplifier based on the first accumulation time corresponding to the electric signal output via the first switch element and the second accumulation time corresponding to the correction electric signal.

8. The image pickup apparatus according to claim 5, wherein:
    the correction unit includes a multiplexer corresponding to the electric signal output via the first switch element and a correction multiplexer corresponding to the correction electric signal,
    and wherein the control unit controls the correction unit such that the electric signal output via the first switch element of the particular pixel and the correction electric signal output via the second switch element of the particular pixel are simultaneously output to the differential circuit.

9. The image pickup apparatus according to claim 1, further comprising:
    a first driving circuit configured to control an on/off-state of the first switch element; and
    a second driving circuit configured to control an on/off-state of the second switch element,
    and wherein the control unit controls an operation of the detection unit by applying control signals to the first driving circuit and the second driving circuit.

10. An image pickup system comprising:
    the image pickup apparatus according to claim 1; and
    a control apparatus configured to control the image pickup apparatus.

* * * * *